United States Patent [19]

Gessner

[11] 4,414,498
[45] Nov. 8, 1983

[54] STEPPING MOTOR DRIVE CIRCUIT
[75] Inventor: Gerald A. Gessner, Munich, Fed. Rep. of Germany
[73] Assignee: Advanced Semiconductor Materials Die Bonding, Inc., Chandler, Ariz.
[21] Appl. No.: 236,840
[22] Filed: Feb. 23, 1981
[51] Int. Cl.³ .............................................. G05B 19/40
[52] U.S. Cl. .................................... 318/696; 318/685
[58] Field of Search .............................. 318/696, 685
[56] References Cited
U.S. PATENT DOCUMENTS
3,797,030 3/1974 Katagiri et al. ...................... 360/52
3,974,434 8/1976 Yablonski ............................ 318/696

Primary Examiner—J. V. Truhe
Assistant Examiner—Saul M. Bergmann
Attorney, Agent, or Firm—Harry M. Weiss

[57] ABSTRACT

A bidirectional stepping motor drive circuit receives stepping pulses and a directional control signal. A binary up/down counter counts the stepping pulses in an up or down direction depending on the state of the directional control signal. A BCD to decimal decoder has inputs coupled to the counter and generates selected outputs in response to selected states of the counter. Logic means responds to the selected outputs and generates phase voltage pulses during which current is supplied to the motor coils. A high voltage starting pulse is applied at the beginning of each stepping cycle to establish the coil current.

22 Claims, 4 Drawing Figures

STEPPING MOTOR DRIVE CIRCUIT

BACKGROUND OF THE INVENTION

1. Field of the Invention

This invention relates generally to stepping motors and, more particularly, to a circuit for providing the required drive currents to the coils of a stepping motor.

2. Description of the Prior Art

Solenoid actuated rachet motors have been used for many years in telephone switching equipment. Rachet steppers may be operated by external DC pulses or by integral make and break contacts on the solenoid switch frame. Rachet steppers are also used for remote tuning of radio equipment and many other angular rotary functions where unidirectional drive in adequate.

Besides being limited to unidirectional drive (in the absence of special and complex designs), rachet motors have other disadvantages. The incremental step of a rachet motor is seldom less than ten degrees, and the output torque is limited if coil currents are to be held to a reasonable value. Stepping motors, in contrast, are capable of high resolution bidirectional stepping and high rotary torque.

Numerical control of machine tools is usually implemented by means of feedback servo motors driving lead screws and other positioning controls. Input or control data is generally in binary form and then converted to analog signals for controlling the servo motors. Stepping motors, which may be driven digitally, are available with a wide range of characteristics (e.g. stalling torque of 25 ounce-inches with a drive of 100 ma to a stalling torque of 3,000 ounce-inches with a drive of 3.9 amps) and could therefore be applicable to a variety of machine control systems where highly accurate positioning and/or angular control is necessary.

With present stepping motors operating with the usual chopper driver circuits for high speed applications, audible noise is always created (even when switching occurs at ultrasonic frequencies due to intermodulation between two chopping coils within the motor). This also generates unwanted losses and heat dissipation in the motor and driver circuits. (Chopping happens continuously even with a stalled motor.)

SUMMARY OF THE INVENTION

It is an object of the present invention to provide an improved stepping motor drive circuit.

It is a further object of the present invention to provide a digital drive circuit for stepping motors which includes solid-state drivers for each of the motor coils.

It is a still further object of the invention to provide a drive circuit for stepping motors which provides substantially instant initiation of the motor step function by quickly driving the motor coil current to nearly rated value; i.e. in approximately 0.25 millisecond.

According to a broad aspect of the invention, there is provided a circuit for driving the motor coils of a stepping motor capable of bidirectional rotation, comprising: first means for receiving a control signal which when in a first state indicates a first desired direction of rotation and when in a second state indicates a second opposite desired direction of rotation, second means for receiving a plurality of stepping pulses, counting means for counting said stepping pulses, said counting means incrementing when said control signal is in said first state and decrementing when said control signal is in said second state, third means coupled to said counting means for decoding selected states of said counting means to produce phase voltage output pulses during which coil current is supplied to said motor coils, and fourth means coupled to said third means and responsive to said phase voltage output pulses for producing coil current pulses.

According to a further aspect of the invention, there is provided a circuit for providing driving pulses to the motor coils of a stepping motor, comprising first means for providing a high-voltage starting pulse to provide a desired coil current, and second means for maintaining said coil current for a predetermined period of time after termination of said starting pulse.

The above and other objects, features and advantages of the present invention will be better understood from the following detailed description taken in conjunction with the accompanying drawings, in which:

DESCRIPTION OF THE PREFERRED EMBODIMENTS

Figure 1:
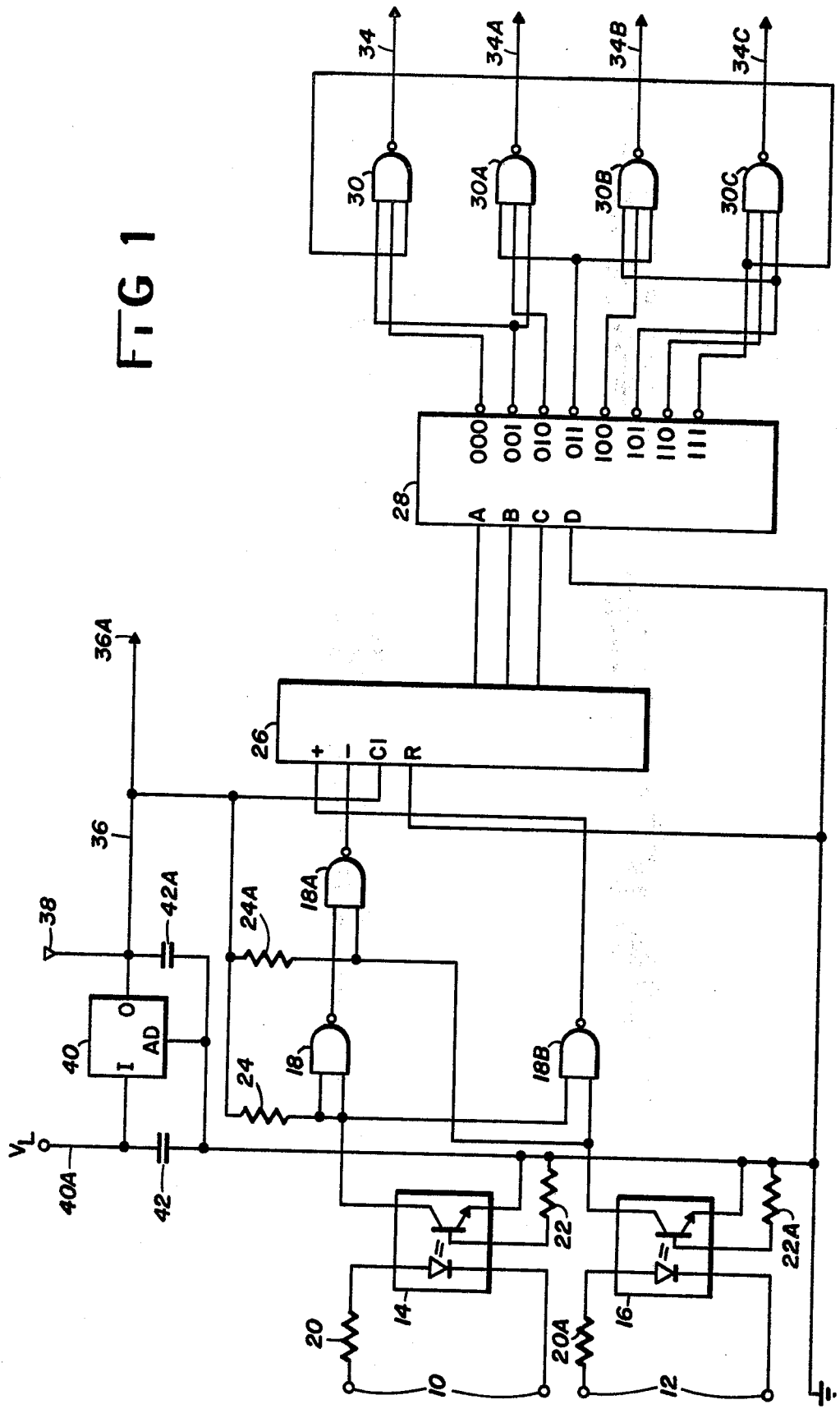
FIG. 1 is a schematic diagram of the inventive motor coil driver circuit control logic.

Referring to FIG. 1, a direction control signal 10 from an external control source (not shown) and a source of stepping or clock signal pulses 12, typically 1 Khz, are applied to first and second opto-isolators 14 and 16 (e.g. type 4N33). The output of opto-isolator 14 is coupled to first and second inputs of NAND gate 18 and to a first input of NAND gate 18B. The output of optoisolator 16 is coupled to the second input of gate 18B and to a first input of NAND gate 18A; the second input of gate 18A is coupled to the output of gate 18. Protective resistors 20 and 20A (e.g. 470 ohm) are coupled in series with the inputs of the light-emitting-diodes of opto-isolators 14 and 16, respectively, and bias resistors 22 and 22A (e.g. 47 K-ohm) are coupled in series between the base electrodes of the internal transistors and ground. A load resistor 24 (e.g. 1 K-ohm) is coupled between a +5 volt regulated supply line 36 and the inputs of gates 18 and 18B as shown. Load resistor 24A (e.g. 1 K-ohm) is coupled between supply line 36 and inputs to gates 18A and 18B as shown.

Block 26 represents a synchronous four-bit binary up/down counter (e.g. an LS74193) having count up (+) and count down (−) inputs, coupled to the outputs of gates 18B and 18A, respectively. Counting occurs at the low-to-high transistion of the input pulse, and the direction of count is determined by which count input is pulsed while the other counter input is held high. A pulse at the up terminal of counter 26 will result in clockwise rotation of the stepping motor while counterclockwise rotation results from pulses at the count down terminal (−). The count-up and count-down pulses must have a width of at least 50 microseconds. Counter 26 is also coupled to supply line 36. As can be seen, when the direction control signal 10 is high, pulses are provided by the gate 18A thereby causing the counter 26 to count down. When the direction control signal 10 is low, pulses are provided by the gate 18B, thereby causing the counter 26 to count up.

The outputs of counter 26 are applied as inputs to a BCD/decimal decoder 28 (e.g. a DM 7442). Depending on the contents of the counter, the decoder 28 will provide a low at one of its outputs while all others remain high. During count up, a low output state will move in a direction from decoder output 000 to 111 while during a count down, the low output will move in a direction from 111 to 000.

NAND gates 30, 30A, 30B and 30C have inputs coupled to selected outputs of decoder 28 and having phase outputs 34, 34A, 34B and 34C. NAND gate 30 has a first input coupled to 000, a second input coupled to 001 and a third input coupled to 111. NAND gate 30A has first, secoond and third inputs coupled to 001, 010 and 011, respectively. NAND gate 30B has first, second and third inputs coupled to 011, 100 and 101, respectively. Finally, NAND gate 30C has first, second and third inputs coupled to 101, 110 and 111, respectively. The outputs of each of gates 30, 30A, 30B and 30C will exhibit three consecutive high outputs as shown in Table I.

TABLE I

| Counter State | Phase Outputs | | | |
|---|---|---|---|---|
| | 34 | 34A | 34B | 34C |
| 000 | 1 | 0 | 0 | 0 |
| 001 | 1 | 0 | 1 | 0 |
| 010 | 0 | 0 | 1 | 0 |
| 011 | 0 | 1 | 1 | 0 |
| 100 | 0 | 1 | 0 | 0 |
| 101 | 0 | 1 | 0 | 1 |
| 110 | 0 | 0 | 0 | 1 |
| 111 | 1 | 0 | 0 | 1 |

A source of supply 40 (e.g. an MC 7805 three terminal regulator) provides the 5-volt regulated power for the control logic and other loads associated with the driver circuits. Source 40 has a first input (I) coupled to a nominal motor drive supply ($V_L$) (e.g. 8 volts) via lead 40A. The regulator input is coupled to ground via capacitor 42 (e.g. 100 ufd), and the output line 36 is coupled to ground via capacitor 42A (e.g. 4 ufd). A test point 38 provides means for verifying the 5-volt supply. To provide for proper regulation, $V_L$ should not drop below 7 volts.

Figure 2:
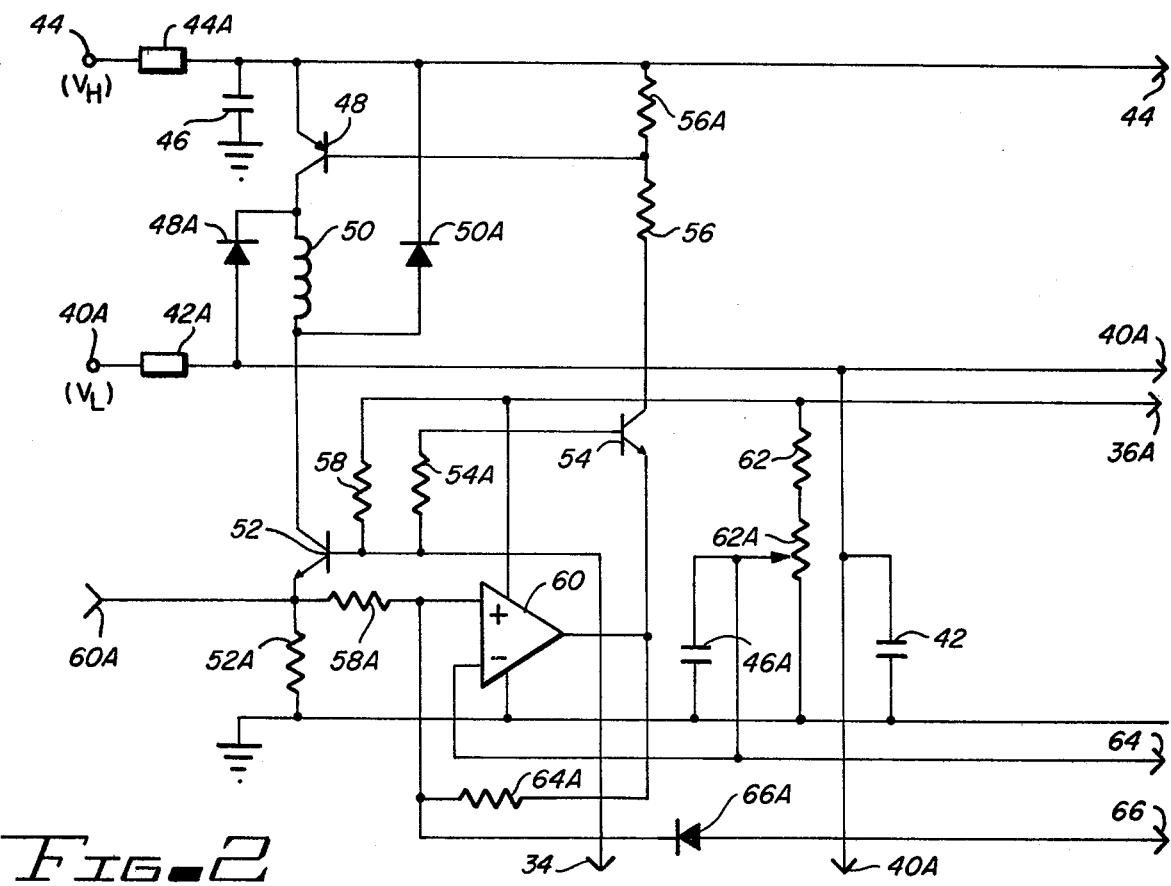
FIG. 2 is a schematic diagram of the inventive motor coil driver circuit.

The motor drive circuit shown in FIG. 2 is one of four identical drivers, one for each motor coil. To obtain maximum torque, the rated coil current must be provided during the high state of the control logic; i.e. when phase outputs 34, 34A, 34B and 34C are high. The rated coil current must also be maintained when operating up to the limit of the specified speed range. Since each motor coil represents a resistance (about 3.2 ohms when cold) in series with a coil inductance (about 8 MH), the operating current and torque will decrease with increasing motor speed. Also, the motor coil time constant (L/R) will increase the rise time of the driving pulse and round off its leading edge.

To overcome the above described problems, a dual power supply is used; i.e. a source of $V_L$ (e.g. 8 volts) which supplies the equivalent rated motor coil current, and a source of $V_H$ (e.g. 45 volts) to supply a starting pulse at the beginning of each stepping cycle.

Referring to FIG. 2, output 34 from NAND gate 30 (FIG. 1) is coupled to the base of power transistor 52 (e.g. a TIP 120) and to the base of low-power transistor 54 (e.g. an MPS-A05) via resistor 54A (e.g. 4 K-ohm). The emitter of transistor 52 is coupled to ground via resistor 52A (e.g. 0.5 ohm) and to test point 60A which can be used to set the value of the motor coil current.

A comparator 60 (e.g. an LM 339 Quad-Comparator) has a first input which is coupled to resistor 58A (e.g. 1 K-ohm) and which is coupled to the output of comparator 60 via resistor 64A (e.g. 10 K-ohm). The first input of comparator 60 is also coupled to the cathode of diode 66A (e.g. a 1N914), the anode of which is coupled by lead 66 to the remaining three coil drivers through other 1N914 diodes (not shown). A second input of comparator 60 is coupled to an adjustable reference voltage ($V_{REF}$) produced at the movable arm of variable resistor 62A (e.g. 5 K-ohm) which is coupled between resistor 62 (e.g. 6 K-ohm) and ground. The other side of resistor 62 is coupled to the regulated 5-volt supply lead 36A. The movable arm of resistor 62A is bypassed to ground by capacitor 46A (e.g. 4.7 uf). First and second control terminals of comparator 60 are coupled respectively to the 5-volt supply lead 36A and ground.

The collector of transistor 54 is coupled to the base of power transistor 48 (e.g. a TIP125) via resistor 56 (e.g. 10 K-ohm). The base of transistor 48 is also coupled to the high-voltage ($V_H$) supply lead 44 via resistor 56A, and the emitter of transistor 48 is coupled directly to lead 44 ($V_H$). The collector of transistor 48 is coupled to a first terminal of motor coil 50, the second terminal of which is coupled to the collector of transistor 52. Transistors 48 and 52 comprise a complementary pair.

The anode of diode 48A (e.g. an MR 851) is coupled to the 8-volt operating supply line 40A. The cathode of diode 48A is coupled to the collector of transistor 48 and to the first terminal of motor coil 50. The cathode of diode 50A (e.g. an MR 851) is coupled to the 45-volt supply line 44 ($V_H$). The anode of diode 50A is coupled to the collector of transistor 52 and to the second terminal of motor coil 50. Eight volt supply 40A ($V_L$) and 45-volt source 44 ($V_H$) are off-board and are coupled to the on-board circuitry by fuse 42A (e.g. 3 amp, 250 volt 3AG) and by fuse 44A (e.g. 1/amp, 250 volt 3AG), respectively.

The circuit operates as follows. A logical high on lead 34 turns on transistors 52 and 54. With transistor 54 on, transistor 48 also turns on. With transistors 48 and 52 conducting at time $t_1$, $V_H$ (45 volts) minus the approximately 1-volt drop in each of the transistors is applied across motor coil 50. Diode 48A becomes back biased to prevent $V_H$ from paralleling the lower voltage supply $V_L$.

The time ($\Delta t$) it takes for the coil current to reach a stated level is $$\Delta t = \frac{\text{COIL INDUCTANCE}}{V} \text{ (COIL CURRENT)}$$

If the rated motor coil current is 1.5 amperes and the coil inductance is 8 mh at 45 volts, $\Delta t$ is 0.27 ms. The voltage drop across resistor 52A is approximately 0.75 volts which also appears at the first input of comparator 60. When the voltage at the first input of comparator 60 equal $V_{REF}$ at the second input of comparator 60, the comparator output switches to a high state turning transistors 54 and 48 off. The voltage at the junction of the emitter of transistor 48 and coil 50 then drops to $V_L$ minus the voltage drop across diode 48A. At time $t_2$, the voltage at the base of transistor 52 drops turning it off and causing the current through coil 50 to decay to zero at a time $\Delta t_2$ after $t_2$.

Figures 3, 3A:
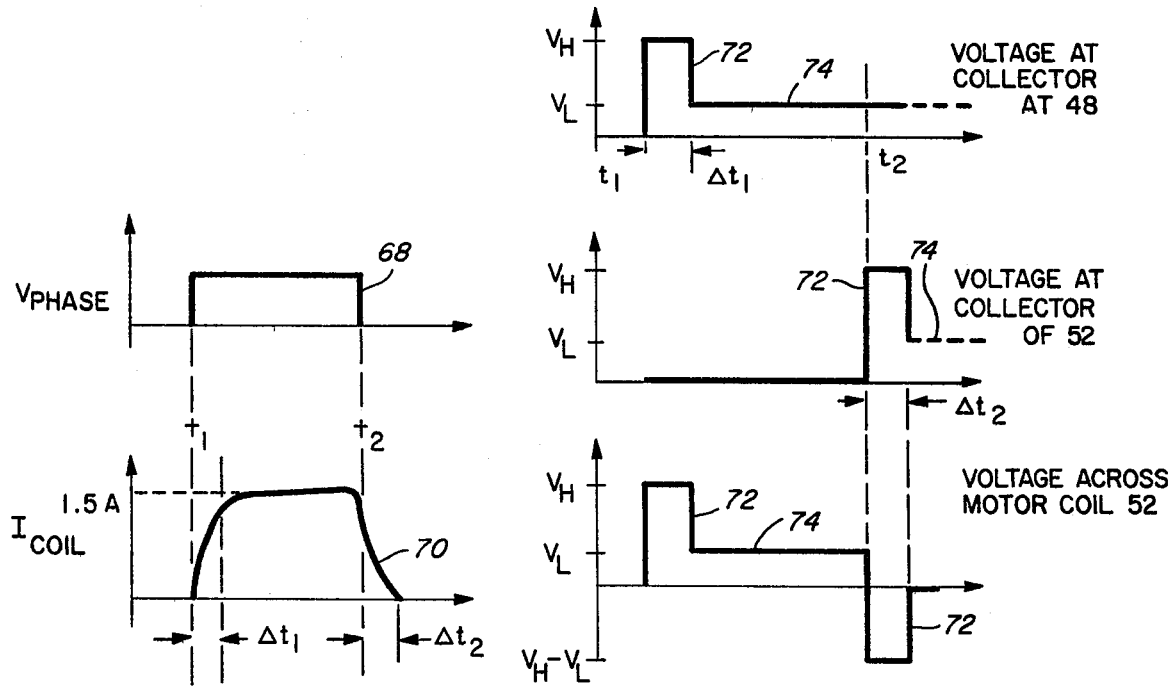
FIG. 3 is a representation of a motor coil voltage and the motor coil current on a common time base.
FIG. 3A shows the voltage values at the collectors of the driver transistors of FIG. 2 and their relation to the voltage across a motor coil.

The input voltage on lead 34 ($V_{PHASE}$) is shown as pulse 68 in FIG. 3. As can be seen in FIGS. 3A and 3 the application of $V_H$ after $t_1$ drives the current in the motor coil to approximately 1.5 amperes as shown at 72 after which $V_H$ is shut off and $V_L$ maintains the motor coil current shown at 74. $V_L$ is shown as 74 in all parts of FIG. 3A, and the motor coil current is designated 70 in FIG. 3.

When transistor 52 is cut off at time $t_2$, the current in motor coil 50 persists for a time $\Delta t_2$ due to the coil's self-inductance. The current flow during time $\Delta t_2$ is maintained through diode 50A back into the $V_H$-supply (or capacitor 46).

In addition to the opto-electronic couplers used in the motor control logic, a third opto-coupler (not shown) may be included for inhibiting application of the high-voltage pulse $V_H$ to motor coil 50. This optional feature holds the voltage high at all four plus (+) terminals of the comparators (one of which is designated 60 in FIG. 2) through diode 66A and lead 66 to the other three motor coil controllers. This keeps transistors 54 and 48 cut off thus preventing input 34 from initiating a pulse from supply $V_H$. Transistor 52 is not inhibited and the motor will run on the $V_L$ supply only. The maximum speed and torque will be limited, but the motor will run quietly and efficiently in a so called "soft step mode".

The absolute value of $V_L$ should be adjusted externally so that the rated current flows in the motor coils. Coil current can be measured at test point 60 (FIG. 2) with the motor at operating temperature (e.g. case temperature equal to 40° C.). $V_{REF}$ may be adjusted via resistor 62A to equal 0.75 volts. Switching of the $V_H$ supply occurs at levels slightly higher or lower than $V_{REF}$ due to the hysteresis introduced by positive feedback via resistor 64A and 58A. The switched on time of the $V_H$ supply can be controlled by adjustment of resistor 62A which can be used to soften up the drive pulse where such operation called for. If for any reason the coil current should drop to the stalling point of the motor ($V_L$ too low), and it is only necessary to raise $V_L$. Light-emitting diodes may be used across $V_H$ and $V_L$ to monitor the supply voltages and indicate that fuses 42A and 44A are intact.

While the invention has been particularly shown and described with reference to a preferred embodiment thereof, it will be understood by those skilled in the art that changes in form and details may be made therein without departing from the spirit and scope of the invention.

The above described specification describes a stepping motor drive circuit which permits two separate modes of operation for stepping motors. One mode starts with a high-voltage pulse (i.e. 45 volts) and subsequently switches to the operating voltage of the stepping motor (i.e. 8 volts). The second mode ("soft step") starts and runs at the operating voltage of the stepping motor. Both of these modes, as desired, can be achieved with the stepping motor drive circuit of this invention.

What is claimed is:

1. A circuit for driving the motor coils of a stepping motor capable of bidirectional rotation, comprising:
   first means for receiving a control signal which when in a first state indicates a first desired direction of rotation and when in a second state indicates a second opposite desired direction of rotation;
   second means for receiving a plurality of stepping pulses;
   counting means coupled to said stepping pulses, said counting means incrementing when said control signal is in said first state and decrementing when said control signal is in said second state;
   third means coupled to said counting means for decoding selected states of said counting means to produce phase voltage output pulses during which coil current is supplied to said motor coils;
   fourth means coupled to said third means and responsive to said phase voltage output pulses for producing coil current pulses;
   fifth means for providing a high-voltage starting pulse at the beginning of each phase voltage output pulse to provide a desired coil current; and
   sixth means for maintaining said desired coil current after termination of said high voltage starting pulse for the remainder of said phase voltage output pulse.

2. A circuit according to claim 1 wherein said fifth means includes:
   a source of a first potential; and
   switching means coupled to said first potential and responsive to said phase voltage output pulse for applying said first potential across said motor coil.

3. A circuit according to claim 2 wherein said sixth means includes:
   a source of a second potential;
   a reference voltage source; and
   comparison means having an output coupled to said switching means, a first input coupled to said reference voltage and a second input coupled to a voltage derived from said coil current for disabling said switching means when the derived voltage reaches said reference voltage and for applying said second potential across said motor coil.

4. A circuit according to claim 3 wherein said first potential is substantially higher than said second potential.

5. A circuit according to claim 1 wherein said counting means is a binary up/down counter.

6. A circuit according to claim 5 wherein said up/down counter increments when said stepping pulses are applied to a first input thereof and wherein said up/down counter decrements when said stepping pulses are applied to a second input thereof.

7. A circuit according to claim 6 wherein said second means comprises:
   a first NAND gate having a first input coupled to said plurality of stepping pulses, a second input coupled to said control signal and an output coupled to said first input of said up/down counter; and
   a second NAND gate having a first input coupled to said plurality of stepping pulses, a second input coupled to the complement of said control signal and an output coupled to said second input of said up/down counter.

8. A circuit according to claim 5 wherein said third means comprises:
   decoder means for generating a plurality of outputs, one for each of a plurality of selected states of the counter; and
   logic means coupled to selected ones of said plurality of outputs for generating said phase voltage output pulses.

9. A circuit according to claim 8 wherein said decoder means is a BCD-to-decimal decoder.

10. A circuit for providing driving pulses to the motor coils of a stepping motor, comprising;
   first means for providing a high-voltage starting pulse to provide a desired coil current; and
   second means for maintaining said coil current for a predetermined period of time after termination of said starting pulse.

11. A circuit according to claim 10 further including third means for generating phase control pulses during which said coil current is supplied.

12. A circuit according to claim 11 wherein said first means includes:
   a source of a first potential; and
   switching means coupled to said first potential and responsive to said phase control pulses for applying said first potential across said motor coils.

13. A circuit according to claim 12 wherein said second means includes:
   a source of a second potential;
   a reference voltage source; and
   comparison means having an output coupled to said switch means, a first input coupled to said reference voltage and a second input coupled to a voltage derived from said coil current for disabling said switching means when the derived voltage reaches said reference voltage and for applying said second potential across said motor coil.

14. A circuit according to claim 13 wherein said first potential is substantially higher than said second potential.

15. A circuit according to claim 11 wherein said third means comprises:
   fourth means for receiving a control signal which when in a first state indicates a first desired direction of rotation and when in a second state indicates a second opposite desired direction of rotation;
   fifth means for receiving a plurality of stepping pulses;
   counting means coupled to said fifth means for counting said stepping pulses, said counting means incrementing when said control signal is in said first state and decrementing when said control signal is in said second; and
   sixth means coupled to said counting means for decoding selected states of said counting means to produce said phase control pulses.

16. A circuit according to claim 15 wherein said counting means is a binary up/down counter.

17. A circuit according to claim 16 wherein said up/down counter increments when said stepping pulses are applied to a first input thereof and wherein said up/down counter decrements when said stepping pulses are applied to a second input thereof.

18. A circuit according to claim 17 wherein said fifth means comprises:
   a first NAND gate having a first input coupled to said plurality of stepping pulses, a second input coupled to said control signal and an output coupled to said first input of said up/down counter; and
   a second NAND gate having a first input coupled to said plurality of stepping pulses, a second input coupled to the complement of said control signal and an output coupled to said second input of said up/down counter.

19. A circuit according to claim 16 wherein said sixth means comprises:
   decoder means for generating a plurality of outputs, one for each of a plurality of selected states of the counters; and
   logic means coupled to selected one of said plurality of outputs for generating said phase control pulses.

20. A circuit according to claim 19 wherein said decoder means is a BCD-to-decimal decoder.

21. A method for driving the motor coils of a stepping motor comprising the steps of:
   applying momentary high-voltage pulses to the motor coils; and
   switching the high-voltage pulses applied to the motor coils to normal operating voltage pulses.

22. A method in accordance with claim 21 including the step of:
   inhibiting the application of the momentary high-voltage pulses to the motor coils in order to apply normal operating voltage pulses.

* * * * *